United States Patent
Kabbani et al.

(10) Patent No.: US 9,473,408 B1
(45) Date of Patent: Oct. 18, 2016

(54) SHORTEST FIRST LONGER NEXT ROUTING WITH CONGESTION REDUCTION

(71) Applicant: GOOGLE INC., Mountain View, CA (US)

(72) Inventors: Abdul Kabbani, Los Gatos, CA (US); Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 14/154,452

(22) Filed: Jan. 14, 2014

(51) Int. Cl.
*H04L 12/803* (2013.01)

(52) U.S. Cl.
CPC .................................. *H04L 47/122* (2013.01)

(58) Field of Classification Search
CPC ..................................................... H04L 47/122
USPC ....................................................... 370/237
See application file for complete search history.

(56) References Cited

U.S. PATENT DOCUMENTS

| | | | |
|---|---|---|---|
| 6,456,588 B1 | 9/2002 | Simmons | |
| 8,094,555 B2* | 1/2012 | Ward | H04L 45/125 370/230.1 |
| 8,441,922 B1* | 5/2013 | McGlaughlin | H04L 49/357 370/218 |
| 8,467,294 B2* | 6/2013 | Raman | H04L 47/125 370/235 |
| 2002/0176363 A1* | 11/2002 | Durinovic-Johri | H04L 45/00 370/237 |
| 2006/0245363 A1* | 11/2006 | Ravindran | H04L 12/4641 370/238 |
| 2011/0261697 A1* | 10/2011 | Crisan | H04L 12/4641 370/235 |
| 2012/0287791 A1* | 11/2012 | Xi | H04L 43/0882 370/237 |
| 2014/0140210 A1* | 5/2014 | Liu | H04L 47/12 370/233 |
| 2014/0169173 A1* | 6/2014 | Naouri | H04L 47/10 370/237 |
| 2014/0169189 A1* | 6/2014 | Kalkunte | H04L 43/10 370/252 |
| 2014/0269325 A1* | 9/2014 | Chrysos | H04L 47/115 370/237 |

OTHER PUBLICATIONS

"Configuring OSPF", Chapter 11, ServerIron ADX Switching and Routing Guide, Brocade Communication Systems, Inc., 2009, 46 pages.

(Continued)

*Primary Examiner* — Siming Liu

(74) *Attorney, Agent, or Firm* — McDermott Will & Emery LLP

(57) ABSTRACT

A technique includes transmitting traffic to a destination via at least a first path of a plurality of paths to the destination, each path including one or more path segments, a plurality of ports being associated with each path segment, receiving port congestion information for each of the ports, determining whether each of the plurality of path segments is congested based on the port congestion information, making a first determination that the first path is congested and that one or more second paths are not congested, each of the paths is determined to be congested if one or more path segments of the path is congested, and re-routing at least some traffic directed to the destination from the congested first path to one or more of the uncongested second paths in response to the first determination.

20 Claims, 6 Drawing Sheets

(56) References Cited

OTHER PUBLICATIONS

"OpenFlow Switch Specification", Open Networking Foundation, Version 1.3.0 (Wire Protocol 0x04), Jun. 25, 2012, 106 pages.
Al-Fares, et al, "A Scalable, Commodity Data Center Network Architecture", SIGCOMM'08, Aug. 17-22, 2008, 12 pages.
Li, et al, "A Multiple-Path Routing Algorithm with Congestion Avoidance Based upon Ant Colony Algorithm in Cognitive Networks", Journal of Computational Information Systems 6:8, 2010, pp. 2473-2482.
McKeown, et al, "OpenFlow: Enabling Innovation in Campus Networks", ACM SIGCOMM Computer Communication Review, vol. 38, Issue 2, Mar. 14, 2008, 6 pages.
Sohn, et al, "Congestion-triggered Multipath Routing based on Shortest Path Information", ICCCN, 2006, pp. 191-196.
Villamizar, "OSPF Optimized Multipath (OSPF-OMP)", Internet Engineering Task Force, Feb. 24, 1999, 38 pages.

* cited by examiner

SHORTEST FIRST LONGER NEXT ROUTING WITH CONGESTION REDUCTION

TECHNICAL FIELD

This description relates to routing and a shortest first longer next routing with congestion reduction.

BACKGROUND

Routers or switches in a network are typically responsible for receiving and forwarding packets. Each switch may perform a routing decision for each packet by, for example, performing a lookup into a forwarding table to identify an output port for forwarding the packet. Various routing algorithms have been used by switches or routers to identify an output port for forwarding each packet.

SUMMARY

According to an example implementation, a method may include transmitting traffic to a destination via at least a first path of a plurality of paths to the destination, each path including one or more path segments, a plurality of ports being associated with each path segment, receiving port congestion information for each of the plurality of ports associated with one or more of the path segments, determining whether each of the plurality of path segments is congested based on the port congestion information, wherein each of the path segments is determined to be congested when at least a threshold number of ports associated with the path segment are congested, making a first determination that the first path is congested and that one or more second paths are not congested, the one or more second paths having a same cost or higher cost than the first path, each of the paths is determined to be congested if one or more path segments of the path is congested, and re-routing at least some traffic directed to the destination from the congested first path to one or more of the uncongested second paths in response to the first determination. Various additional features may be provided, as described below.

According to an example implementation, path cost may be determined based on a number of segments or hops for the path.

According to an example implementation, each of the path segments may include a plurality of parallel links, each link connecting an edge port of a first POD (performance optimized data center) to an edge port of a second POD.

According to an example implementation, path cost is based on a number of inter-POD segments or hops for the path.

According to an example implementation, each of the path segments is determined to be congested when at least a threshold number of edge ports associated with the path segment of a source POD are congested.

According to an example implementation, the re-routing at least some traffic directed to the destination from the congested first path to one or more of the uncongested second paths may include: increasing port weights for the one or more of the uncongested second paths to increase a likelihood that a flow or traffic will be transmitted to the destination via one of the second paths, and decreasing port weights for the congested first path to decrease a likelihood that a flow or traffic will be transmitted to the destination via the congested first path.

According to an example implementation, the re-routing at least some traffic directed to the destination from the congested first path to one or more of the uncongested second paths may include updating a forwarding table for the destination for one or more switches by performing at least one of the following: decreasing a number of entries in the forwarding table for ports that are associated with the congested first path; and increasing a number of entries in the forwarding table for ports that are associated with the one or more of the uncongested second paths.

According to an example implementation, the threshold may include a first threshold, and wherein one or more of the path segments, after previously being determined to be congested, is determined to be uncongested if less than a second threshold number of ports associated with the path segment are congested, wherein the second threshold is less than the first threshold.

According to an example implementation, the method may further include receiving updated port congestion information for the plurality of ports, making a second determination, subsequent to the first determination, that the first path is still congested and that the one or more second paths are still not congested, and re-routing at least some additional traffic directed to the destination from the congested first path to the one or more uncongested second paths.

According to an example implementation, the method may further include receiving updated port congestion information for the plurality of ports, making a second determination, subsequent to the first determination, that the first path is not congested, and re-routing at least some traffic directed to the destination from the one or more second paths to the uncongested first path, the first path having a lower cost than the one or more second paths.

According to an example implementation, the re-routing at least some traffic directed to the destination from the one or more second paths to the uncongested first path may include updating a forwarding table for the destination for one or more switches by performing at least one of the following: increasing a number of entries in the forwarding table for ports that are associated with the uncongested first path, and decreasing a number of entries in the forwarding table for ports that are associated with the one or more second paths.

According to an example implementation, the method may further include receiving updated port congestion information for the plurality of ports, making a second determination, subsequent to the first determination, that the first path and the one or more second paths are congested, and that one or more third paths are not congested, wherein the one or more third paths having a higher cost than the first path and the one or more second paths, and re-routing at least some traffic directed to the destination from the congested first path and the congested one or more second paths to the uncongested one or more third paths.

According to an example implementation, wherein a first group of ports associated with the first path are congested, and a second group of ports associated with the first path are not congested, the method further including re-routing at least some of the traffic that is routed to the destination via the first path from using one or more of the congested first group of ports to using one or more of the second group of ports.

According to an example implementation, a computer program product is provided that includes a non-transitory computer-readable storage medium and storing executable code that, when executed by at least one data processing apparatus, is configured to cause the at least one data processing apparatus to perform a method that includes: transmitting traffic to a destination via at least a first path of a plurality of paths to the destination, each path including one or more path segments, a plurality of ports being associated with each path segment, receiving port congestion information for each of the plurality of ports associated with one or more of the path segments, determining whether each of the plurality of path segments is congested based on the port congestion information, wherein each of the path segments is determined to be congested when at least a threshold number of ports associated with the path segment are congested, making a first determination that the first path is congested and that one or more second paths are not congested, the one or more second paths having a same cost or higher cost than the first path, each of the paths is determined to be congested if one or more path segments of the path is congested, and re-routing at least some traffic directed to the destination from the congested first path to one or more of the uncongested second paths in response to the first determination.

According to an example implementation, an apparatus may include at least one processor and at least one memory including computer instructions, when executed by the at least one processor, cause the apparatus to: transmit traffic to a destination via at least a first path of a plurality of paths to the destination, each path including one or more path segments, a plurality of ports being associated with each path segment, receive port congestion information for each of the plurality of ports associated with one or more of the path segments, determine whether each of the plurality of path segments is congested based on the port congestion information, wherein each of the path segments is determined to be congested when at least a threshold number of ports associated with the path segment are congested, make a first determination that the first path is congested and that one or more second paths are not congested, the one or more second paths having a same cost or higher cost than the first path, each of the paths is determined to be congested if one or more path segments of the path is congested, and re-route at least some traffic directed to the destination from the congested first path to one or more of the uncongested second paths in response to the first determination.

According to an example implementation, a method may include receiving, at a controller for a first POD (performance optimized data center), port congestion information from each of a plurality of reporting switches, determining if any ports of the reporting switches are congested based on the port congestion information, determining whether each of a plurality of path segments from the first POD to one or more adjacent PODs are congested, wherein each of the path segments is determined to be congested if at least a threshold number of ports associated with the path segment are congested, and sending a message to a network controller indicating a congestion status, as either congested or not congested, for each of one or more of the path segments. Various additional features may be provided, as described below.

According to an example implementation, the method may further include receiving, at the controller for the first POD from the network controller, one or more path segment update instructions that instruct the controller for the first POD to adjust an amount of traffic transmitted via one or more of the path segments, determining forwarding table updates for one or more switches of the first POD to adjust an amount of traffic transmitted via one or more of the path segments in accordance with the one or more path segment update instructions, and sending the determined forwarding table updates to one or more switches within the POD.

According to another example implementation, a computer program product is provided, the computer program product including a non-transitory computer-readable storage medium and storing executable code that, when executed by at least one data processing apparatus, is configured to cause the at least one data processing apparatus to perform a method including: receiving, at a controller for a first POD (performance optimized data center), port congestion information from each of a plurality of reporting switches, determining if any ports of the reporting switches are congested based on the port congestion information, determining whether each of a plurality of path segments from the first POD to one or more adjacent PODs are congested, wherein each of the path segments is determined to be congested if at least a threshold number of ports associated with the path segment are congested, and sending a message to a network controller indicating a congestion status, as either congested or not congested, for each of one or more of the path segments.

According to an example implementation, an apparatus is provided that includes at least one processor and at least one memory including computer instructions, when executed by the at least one processor, cause the apparatus to: receive, at a controller for a first POD (performance optimized data center), port congestion information from each of a plurality of reporting switches, determine if any ports of the reporting switches are congested based on the port congestion information, determine whether each of a plurality of path segments from the first POD to one or more adjacent PODs are congested, wherein each of the path segments is determined to be congested if at least a threshold number of ports associated with the path segment are congested, and send a message to a network controller indicating a congestion status, as either congested or not congested, for each of one or more of the path segments.

According to an example implementation, an apparatus may include means for transmitting traffic to a destination via at least a first path of a plurality of paths to the destination, each path including one or more path segments, a plurality of ports being associated with each path segment, receiving port congestion information for each of the plurality of ports associated with one or more of the path segments, means for determining whether each of the plurality of path segments is congested based on the port congestion information, wherein each of the path segments is determined to be congested when at least a threshold number of ports associated with the path segment are congested, means for making a first determination that the first path is congested and that one or more second paths are not congested, the one or more second paths having a same cost or higher cost than the first path, each of the paths is determined to be congested if one or more path segments of the path is congested, and means for re-routing at least some traffic directed to the destination from the congested first path to one or more of the uncongested second paths in response to the first determination.

According to an example implementation, an apparatus may include means for receiving, at a controller for a first POD (performance optimized data center), port congestion information from each of a plurality of reporting switches, means for determining if any ports of the reporting switches are congested based on the port congestion information, means for determining whether each of a plurality of path segments from the first POD to one or more adjacent PODs are congested, wherein each of the path segments is determined to be congested if at least a threshold number of ports associated with the path segment are congested, and means for sending a message to a network controller indicating a congestion status, as either congested or not congested, for each of one or more of the path segments.

The details of one or more implementations are set forth in the accompanying drawings and the description below. Other features will be apparent from the description and drawings, and from the claims.

DETAILED DESCRIPTION

Figure 1:
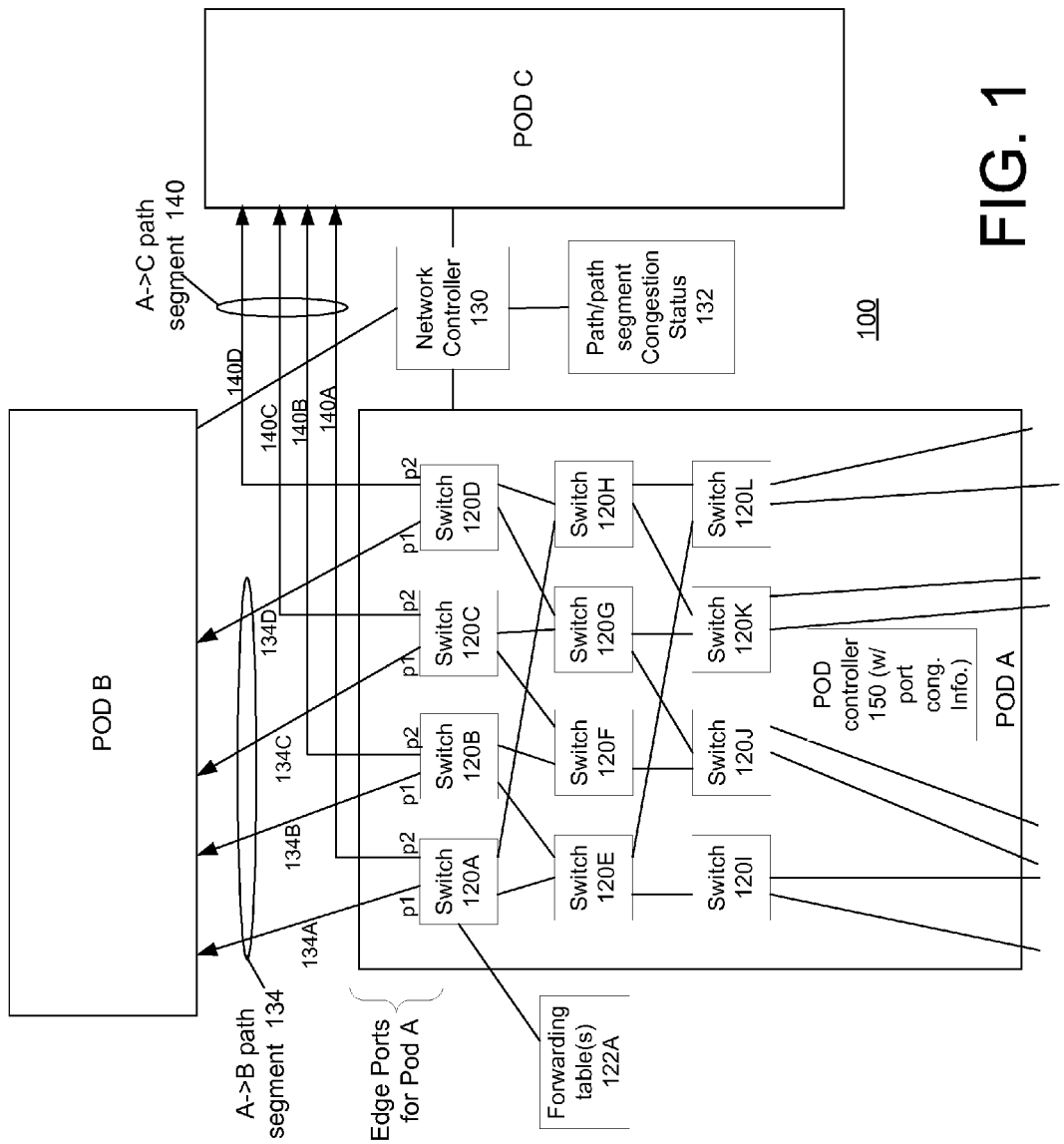
FIG. 1 is a block diagram illustrating a network according to an example implementation.

This document describes systems and techniques relating to routing, and in particular to a shortest first, longer next, routing technique that includes congestion reduction.

According to an example implementation, routing of traffic is prioritized for a network from a source, such as a source performance optimized data center (POD) towards a destination, such as a destination POD over a set of one or more lowest-cost (or lower-cost) paths, e.g., shortest paths or paths with a lowest number of hops between the source and the destination. According to an example implementation, when the lowest-cost path becomes congested, at least a portion or some of the traffic directed to the destination is moved or re-routed from the lowest-cost path to one or more second paths that are the same cost or higher cost than the lowest-cost path. The re-routing of traffic may be a gradual or incremental change, rather than a complete moving or re-routing of traffic to a new path, for example.

According to an example implementation, a network may include multiple PODs, where each POD may include a plurality of interconnected switches. Each path may include one or more path segments, e.g., inter-POD segments or segments that connect two PODs together. According to one example implementation, a path may be considered (or determined) to be congested when any path segment of (or along) the path becomes congested. Also, for example, there may be a plurality of ports associated with each path segment. According to an example implementation, a path segment may be determined to be congested when at least a threshold number of the ports associated with the path segment become (or are) congested.

For each POD within a network, port congestion information for ports within the POD may be periodically collected or received by a POD controller (or controller for a POD) from switches of the POD. For example, port congestion information, e.g., which may include information that may indicate whether each port has become congested or not, may be collected or received by a POD controller for at least edge ports of the POD. For example, edge ports of a POD may include ports that are directly connected via a link to an adjacent POD. Based on the port congestion information, the POD controller may determine whether any of one or more path segments are congested. For example, a path segment may be determined by the POD controller to be congested if at least a threshold number of ports (e.g., edge ports) associated with the path segment are congested.

Initially, traffic, e.g., for one or more flows, may be transmitted from a source (e.g., source POD) to a destination (e.g., destination POD) via a lowest-cost path, or a set of one or more lowest-cost paths. For example, the lowest-cost path may be a path from the source to the destination and may have a fewest number of hops or path segments. A number of hops is one example of path cost, and other criteria (such as delay) may be used to determine a cost of each path. Thus, a lowest-cost path may be, for example, a single (or one) hop (or one path segment) path directly from a source subnet (or source POD) to a destination subnet (or source POD). Higher-cost (or greater hop) paths may also be available, such as two-hop (two path segment) paths, three-hop (three path segment) paths, etc.

Eventually, the port congestion information may indicate that the lowest-cost path(s) has become congested. According to one example implementation, a path may be congested when at least a first threshold number of ports (e.g., edge ports at a source POD) associated with the path have become congested. Thus, for example, when too many ports (e.g., edge ports of a source subnet or source POD) associated with a path segment have become congested, then any paths that use that congested path segment may be determined or marked by the POD controller as congested. When that occurs, at least in some situations, the POD controller may then incrementally increase the amount of traffic directed to the destination over one or more uncongested paths (via a path segment that is not congested), where, for example, the one or more uncongested paths may be the same or higher cost than the congested lowest-cost path. Thus, in this example, when the lowest-cost path becomes congested, the POD controller may re-route at least some of the traffic to the destination from the congested lowest-cost path to one or more uncongested paths (e.g., via an uncongested path segment) that are the same or higher cost than the lowest-cost path. For example, the lowest-cost path may include one hop or one path segment, whereas the one or more uncongested paths may be two hops or may include two path segments. This is just one example, and others may be used.

If the port congestion information subsequently indicates that the lowest-cost path is no longer congested, then some traffic directed to the destination may be moved or re-routed from one or more of the higher-cost paths back to the lowest-cost path(s). According to an example implementation, the re-routing of traffic based on path or path segment congestion status may be performed in a gradual or incremental fashion, e.g., where a relatively small or an incremental amount of traffic is moved or re-routed among paths over time, depending on congestion status.

FIG. 1 is a block diagram illustrating a network according to an example implementation. Network 100 may include a plurality of interconnected subnets or performance optimized data centers (PODs), such as POD A, POD B, POD C, etc. Although only three PODs are shown in network 100 of FIG. 1, any number of PODs may be provided. A POD may include a plurality of interconnected switches or routers (hereinafter switches). Within a POD, the switches may be connected or arranged in a mesh arrangement, for example, with each switch connected to one or more other switches. The arrangement of the network 100 shown in example implementation of FIG. 1 is merely an example, and other networks, arrangements or network configurations may be used.

Each POD may include a plurality of interconnected switches. For example, POD A may include switches 120A, 120B, 120C, 120D as an upper row of switches, switches 120E, 120F, 120G and 120H as a middle row of switches, and switches 120I, 120J, 120K and 120L as a lower row of switches. Thus, in this example, POD A includes 12 switches, but this is merely an example, and a POD or subnet may include any number of switches. The switches of POD A may be connected or provided in a mesh arrangement, with one or more of the switches connected to one or more other switches in the POD, and to other PODs or devices. For example, switch 120E is connected to switches 120A, 120B, 120I and 120L, as examples. Switch 120A is connected to switch 120E, switch 120H and to POD B (or a switch not shown in POD B). While the example switches are shown only for POD A, the other PODs (e.g., PODs B and C) of network 100 may include a similar arrangement or interconnection of switches.

Each of the switches may include a forwarding table or routing table. For example, switch 120A may include a forwarding table 122A, which may include a forwarding table for each destination. The forwarding table 122A may include one or more entries, where each entry in the forwarding table identifies a port or output port for forwarding outputting the received packet. For example, switch 120A (or a processor included within switch 120A) may perform a lookup into a content addressable memory (CAM) based on one or more fields of the received packet to identify an entry in the forwarding table that identifies a port of the switch 120A for forwarding the packet. The switch may then forward or output the packet via the identified port of the switch 120A.

According to an example implementation, PODs may be interconnected by a path segment (or one or more path segments). A path segment may be, or may include, one or more (e.g., parallel) communication links between two PODs. Also, one or more switches within each POD may include edge ports. For example, edge ports of a POD may include ports that are on the edge of the POD, and/or ports of a POD that are directly connected via a link to an adjacent POD. For example, ports 1 and 2 (p1, p2) of switches 120A, 120B, 120C and 120D may be considered edge ports. Port 1 of each of these switches (120A, 120B, 120C, and 120D) is connected via a respective link to POD B. Similarly, port 2 of each of these switches (120A, 120B, 120C, and 120D) is connected via a respective link to POD C. In the illustrative example of FIG. 1, an A→B path segment 134 may include the parallel communication links (or links) 134A, 134B, 134C and 134D. For example, link 134A connects port 1 of switch 120A to POD B; link 134B connects port 1 of switch 120B to POD B; link 134C connects port 1 of switch 120C to POD B; and link 134D connects port 1 of switch 120D to POD B. Similarly, the A→C path segment 140 may include a group of parallel links between POD A and POD C, including links 140A, 140B, 140C and 140D.

In addition, a path from a source to a destination may include one or more path segments or hops. For example, a lowest-cost path from POD A to POD B may be or include the A→B path segment, which is just one hop or one path segment. A higher-cost path from POD A to POD B may be the path A→C→B, which includes two path segments (the A→C path segment, and then the C→B path segment). A packet may also traverse one or more internal switches that are internal to each POD (e.g., switches 120E, 120F of POD A), but these internal hops are not part of the path or path segments, which may refer to inter-POD path segments, or path segments between PODs, according to an example implementation. These are merely some illustrative examples of paths, and others may be used.

According to an example implementation, network 100 may include one or more controllers, such as a POD controller for each POD and a network (or central) controller 130. For example, POD A may include a POD controller 150 for communicating with switches within the POD A and performing functions or tasks specific to POD A. Other PODs may similarly include a POD controller. The POD controller 150 for POD A may receive and store port congestion information for various ports from switches within POD A. Network controller 130 may, for example, communicate with POD controllers within the network 100, and may perform functions or tasks for the network 100. Network controller 130, for example, may receive from one or more POD controllers and store in memory a congestion status 132 for one or more paths or path segments, as described in greater detail herein below.

According to an example implementation, routing of traffic may be prioritized from a source to a destination over a set of one or more lowest-cost (or lower-cost) paths. According to an example implementation, when the lowest-cost path becomes congested, at least a portion or some of the traffic directed to the destination may be moved or re-routed from the lowest-cost path to one or more second paths that are the same cost or higher cost than the lowest-cost path. The re-routing of traffic may be a gradual or incremental change, rather than a complete moving or re-routing of traffic to a new path, for example.

A path segment may include one or more parallel links from one POD to another POD, for example. Also, for example, there may be a plurality of ports (e.g., edge ports) associated with each path segment. For example, the one or more ports associated with a path segment may include the one or more edge ports on a source POD of the path segment. A source POD, for example, may be a POD where a packet is being forwarded from, and a destination POD may be a POD to which the packet is being forwarded. As shown in FIG. 1, port 1 of switch 120A, port 1 of switch 120B, port 1 of switch 120C and port 1 of switch 120D may be associated with A→B path segment 134. Also, as shown in FIG. 1, port 2 of switch 120A, port 2 of switch 120B, port 2 of switch 120C and port 2 of switch 120D may be associated with A→C path segment 140.

According to an example implementation, a path segment may be determined to be congested when at least a threshold number of the ports associated with the path segment become (or are) congested. For example, there are 4 ports spread across or among multiple (e.g., 4) different switches (switches 120A, 120B, 120C and 120D) that are associated with the A→B path segment 134. According to an example implementation, edge ports at a source POD may be associated with a path segment if the edge ports are connected to links of the path segment. In one illustrative example, the A→B path segment 134 may be considered or determined to be congested if at least three of the ports associated with the path segment 134 are congested. For example, if at least the threshold number of ports associated with the path segment are congested, then the entire path segment is considered or determined to be congested. In this example, the threshold is three. In another example, if there are 8 edge ports associated with a path segment, then a threshold of five or six ports may be used. These are merely some examples, and any number of ports may be associated with a path segment and any number may be used (that is less than or equal to the number of ports associated with the path segment) as a threshold for a path segment for determining when that path segment is congested.

In addition, a path may be determined to be congested if any path segment along such path is congested. Therefore, the path A→C→B (e.g., which is a path from POD A to POD C to POD B) may be determined to be congested if either the A→C path segment is congested or the C→B path segment is congested. As noted, a path segment may be determined to be congested if at least a threshold number of ports (e.g., edge ports) associated with that path segment are congested. According to one example implementation, once a path segment is determined to be congested, then any paths that include (or use) that path segment may also be considered or determined to be congested. According to an example implementation, after detecting that a path (e.g., a lowest-cost path) has become congested, then at least some traffic being handled or carried on such congested path may be re-routed to one or more other uncongested paths.

For each POD within a network, port congestion information for ports within the POD may be periodically collected or received by a POD controller (or controller for a POD) from switches of the POD. For example, port congestion information, e.g., which may include information that may indicate whether each port has become congested or not, may be collected or received by a POD controller 150 for at least edge ports of the POD. Some edge ports are shown and described above for POD A, but other ports may also be considered as edge ports for POD A. Based on the port congestion information received for each (or one or more) of these ports, the POD controller 150 may determine whether any of one or more path segments are congested. For example, POD controller 150 may determine that the A→B path segment 134 is congested if at least a threshold number of (e.g., three) ports associated with the path segment 134 are congested. A different threshold may be used for each path segment. POD A may be a source POD and have associated edge ports for other path segments, such as for A→C path segment 140. In a similar fashion, POD controllers at other PODs (e.g., PODS B and C) may receive congestion information for one or more ports (e.g., edge ports) within those PODs, and determine (based on such port congestion information) if any of the path segments, e.g., for which such POD is a source POD or has edge ports, is congested.

Port congestion information may be collected by each switch and reported to its POD controller using a variety of different techniques. For example, when one or more packet buffers or queues at a switch exceed a threshold level of fullness, the switch my begin dropping packets. The switch may, for example, include a packet drop counter for each of its ports that is incremented each time a packet is dropped. The number of packets dropped per port may be reported to the POD controller 150.

In another example of port congestion information, explicit congestion notification (ECN) may be used by one or more of the switches to provide a congestion notification or communicate with other switches along a path when the switch has detected congestion. For example, when a switch in a POD detects congestion on an outgoing link (e.g., one or more packet queues or buffers for packets to be transmitted reach a threshold level of fullness), then a CE (congestion experienced) bit may be set by the switch in one or more packets that are forwarded, rather than dropping the packet(s). A receiver at the end of a path may receive the packet (s) with the CE bit set, and may send a reply (or congestion acknowledgement), such as a ECN-echo (ECE flag is set) on one or more outgoing packets in the opposite direction, which may eventually reach the source of the original packet, and may cause the source to reduce the rate of transmitted packets and thereby decrease congestion along the path. A switch may provide a count of the number of packets forwarded per port with the CE bit set, or may count the number of packets received and forwarded that included a CE bit that was set. This ECN information, on a per port basis (or for each port), may be collected by one or more switches and reported to the POD controller 150, for example. These are merely some illustrative examples of port congestion information that may be collected by a switch and reported to the POD controller 150. Many other techniques may be used to detect, collect and communicate port congestion information.

According to an example implementation, switches within each of the PODs may collect and report port congestion information for their ports to the POD controller. With respect to POD A for example, the POD controller 150 may determine if any path segment (e.g., any path segments having a source of such segment that is POD A, such as A→C path segment or A→B path segment) are congested based on the port congestion information. For example, POD controller 150 may identify any congested ports based on the port congestion information. The POD controller 150 may then determine whether any path segment is congested, e.g., by determining whether at least a threshold number of ports associated with the path segment are congested. A different threshold number of ports may be used for each path segment, and the threshold may depend upon the total number of ports associated with the path segment. For example a threshold may be provided as a percentage of ports associated with the path segment, e.g., 50%, 55%, 60%, as examples. The POD controller 150 may then send a message to network controller 130 indicating a path segment congestion status, e.g., as either congested or not congested, for one or more path segments. For example, the message from POD controller 150 to network controller may indicate:

path segment A→B—Congested; path segment A→C—Not Congested

Also, a path segment may be directional. Thus there may be a different status for the two path segments: A→B, and B→A.

The network controller 130 may then determine if any paths within the network are congested based on the path segment congestion status received from each of the POD controllers for the various path segments. As noted, according to an example implementation, a path from a source to a destination is considered congested if any path segment along such path is congested. Based on the path segment congestion status information, the network controller 130 is able to determine which paths are congested, and identify one or more other uncongested paths that may be used to re-route at least some traffic. For example, if a path segment of a lowest-cost path is congested (e.g., meaning that the entire lowest-cost path is considered to be congested), then the network controller 130 may re-route at least some traffic to the destination from the congested lowest-cost path to one or more uncongested higher-cost paths.

According to an example implementation, in order to re-route traffic to one or more other (or alternate) paths, the network controller 130 may identify one or more congested paths based on the congestion status of one or more path segments received from one or more POD controllers. Also, based on this path segment congestion status information, the network controller may identify one or more other uncongested paths that should (or may) be used to re-route some traffic for one or more destinations.

According to an example implementation, each POD controller may have information regarding the status of ports, congestion and switches within its own POD, and does not necessarily have a view or information regarding the congestion or status of ports, switches, etc. outside of its own POD. However, network controller 130 may receive status and other information from all of the PODS/POD controllers, such as path segment congestion status for various path segments as reported from the different POD controllers. Therefore, the network controller 130 is able to determine which paths are congested, and is able to identify one or more alternate uncongested paths for each destination within the network.

The network controller 130 may then send one or more path segment update instructions to each of one or more POD controllers to instruct the POD controller to re-route at least some traffic from a first congested path via a first path segment to a second uncongested path via a second path segment (or alternatively to re-route at least some traffic to a plurality of uncongested second paths via their respective path segments). For example, a path segment update instruction may instruct a POD controller to increase traffic or decrease traffic to a path or path segment, e.g., for traffic directed to a specific destination. For example, if direct path A→B become congested for the destination of B, then network controller 130 may re-route some traffic from the A→B path to a next-highest cost path A→C→B.

According to an example implementation, to accomplish this traffic re-routing, the network controller 130 may send a path segment update instruction(s) that, for example, instructs the POD controller 150 for POD A, for traffic directed to destination B (POD B), to re-route at least some traffic from congested path A→B (via path segment B) to uncongested path A→C→B (via path segment C). In one example implementation, the path segment update instruction(s) may simply instruct the POD controller 150 to increase some of the traffic directed to B via path segment C, and/or to decrease the traffic directed to B that is transmitted via path segment B, which will have the effect of re-routing at least some of the traffic directed to B from the A→B path to the A→C→B path, for example.

In response to receiving the path segment update instruction(s) from network controller 130, the POD controller 150 for POD A may determine forwarding table updates for one or more (or even all) of the switches within POD A in order to effect or perform the path or path segment updates received from the network controller 130 (e.g., as specified by the path segment update instructions). Some examples are described below with respect to FIGS. 2-4 in which forwarding tables are updated to re-route at least some traffic to one or more uncongested paths. The use of a POD controller for each POD and a network controller 130 for the network is one illustrative example, and other network configurations may be used.

According to some example implementations, possible rationale for prioritizing routing of traffic on the shorter or lower-cost paths may include: 1) higher throughput, since transmitting data using fewer network resources, e.g., fewer links per byte of transmitted data typically leads to higher throughput in the network, and 2) lower delays, since traversing fewer hops towards a destination generally results in a smaller aggregate delays (e.g., smaller queuing delays, switching delays and/or propagation delays) for the transmission of data within a network(s). Furthermore, there may be advantages to incrementally re-routing of data/traffic when shorter (or lower-cost) paths become congested or under-utilized, such as to avoid over-reacting to noisy or short-term traffic growth or changes in traffic flow in a network. Thus, re-routing traffic in a gradual manner may also assist with alleviating out-of-order delivery when flows are re-mapped to other paths. Thus, flows may be re-mapped to paths of different lengths when a path congestion status changes, e.g., a path is determined to be congested or not congested. Thus, according to one example, implementation, a flow is not necessarily remapped to a new path when a congestion status changes for an existing path used for the flow. However, according to an example implementation, in some cases, a flow may be re-routed to a destination over a new path (via a new or different path segment).

According to one example implementation, a forwarding table for each destination may be provided for (or at) each switch within a POD or subnet within a network. A hash function may be performed by a switch on one or more fields (e.g., a 5-tuple of source IP address, destination IP address, source port and destination port and protocol type) for each received packet to determine a port for forwarding the packet. The resulting hash may be used to perform a lookup into one of N entries of the forwarding table to identify a port for forwarding the packet. One or more entries may be provided for each of the different ports. Each port may be associated with a path segment or path of a plurality of different paths. For example, based on the random selection nature of the hashing process, one or more entries for a port may be added to a forwarding table to increase a likelihood that such port (and thus, the associated path) will be selected for forwarding a packet or flow. Similarly, one or more entries for a port may be removed or deleted from a forwarding table to decrease a likelihood that such port (and thus the associated path) will be selected for forwarding the packet or flow.

According to an example implementation, some incremental traffic may be moved or re-routed from a lowest-cost path to one or more higher-cost paths when the lowest-cost path becomes congested. In such a case, some incremental traffic may be moved or re-routed by, for example, performing one or more of the following for one or more switches in a network: decreasing a number of entries in a forwarding table for ports that are associated with the congested lowest-cost path, and/or increasing a number of entries in the forwarding table for ports that are associated with an uncongested and next lowest-cost path(s). For example, performing one or both of these actions when congestion is detected on the lowest-cost path may result in an incremental increase in traffic over the one or more uncongested next lowest-cost paths, and an incremental decrease in traffic over the congested lowest-cost path. A similar process may be used to move traffic back to the lowest-cost path. For example, one or more forwarding table entries may be added to forwarding tables for port(s) associated with the lowest-cost path and/or one or more forwarding table entries may be deleted or removed for port(s) associated with higher-cost path(s) to incrementally move some traffic back to the lowest-cost path when such lowest-cost path becomes uncongested, for example.

Figure 2:
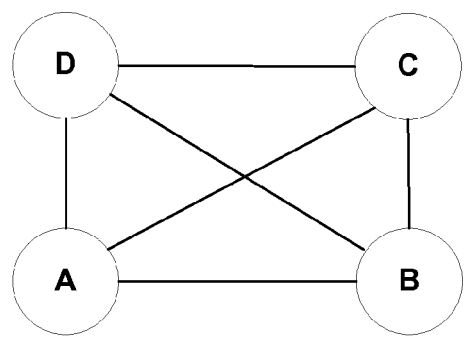
FIG. 2 is a diagram illustrating routing of traffic on a network according to an example implementation.

FIG. 2 is a diagram illustrating routing of traffic on a network according to an example implementation. In FIG. 2, four nodes are shown including node A, node B, node C, and node D, which may simply be referred to as A, B, C and D. Nodes may be (or may represent) PODs. Or, a node may be a switch located in a POD that is connected to one or more other PODs (or connected to other switches at other PODs). For example, node A may be a switch at an edge of POD A, node B may be a switch within POD B, node C may be a switch within POD C, and node D may be a switch within node D. Each of the nodes (A, B, C and D) may include one or more forwarding tables that may be used to perform a lookup to determine a port for forwarding packets.

As shown in FIG. 2, path segments are provided between each of the nodes, including A→B path segment 210, A→C path segment 212, A→D path segment 214, D→C path segment 216, D→B path segment 218 and C→B path segment 220. In this example, node A may be sending data or packets (traffic) to node B. Initially, traffic directed from node A to node B may be transmitted from port 1 of node A to node B via the A→B path segment 210. Node A may also be: connected from port 2 to C via A→C path segment 212, and connected from port 3 to node D via the A→D path segment 214. Although only one link is shown for each path segment, it is understood that each path segment may include multiple links in parallel, e.g., from different ports and switches within a POD. For example, the A→B path segment 210 in fact may include multiple communication links, each link connected to a respective port on POD A. For example, there may be 8 edge ports on POD A associated with the A→B path segment. This is merely an example, and each path segment may include any number of associated ports. Initially, the forwarding table used by node A for node B as a traffic destination may be something like the following, as an example:

Table 1—Forwarding Table for Node A—Destination of Node B:

Entry 1—port 1 (A→B path segment for A→B path)

Therefore, in the example Table 1, there is only one entry, which specifies port 1 for node A, when node B is the destination. Therefore, in this example, all traffic received at node A that is directed to node B would initially be forwarded via port 1 to node B via the A→B path segment for the A→B path, which is the lowest-cost path from POD A to POD B. However, at some point, the A→B path segment 210 may become congested, e.g., if at least a first threshold number of ports at POD A associated with the A→B path segment 210 are congested. POD controller 150 for POD A may receive port congestion information from various switches within POD A and may detect when at least a threshold number of ports associated with the A→B path segment 210 have become congested. These ports associated with this path segment 210 may be distributed across multiple switches within POD A.

When the A→B path segment 210 becomes congested, node A may update its forwarding table to increase the port weights for one or more uncongested second paths that may be the same or higher cost (e.g., same or greater number of hops/path segments) as the lowest-cost path from A→B, and/or may decrease the port weights for the congested lowest-cost path. These changes to the forwarding table for node A may increase a likelihood that a flow or traffic directed to node B/POD B will be transmitted via one of these uncongested second paths and may decrease the likelihood that traffic directed to POD B/node B will be transmitted via the congested lowest-cost path that uses the A→B path segment 210. Therefore, these forwarding table changes may cause some of the traffic directed to node B to be re-routed from the lowest-cost path to one or more uncongested second (higher-cost) paths.

According to one illustrative example, to accomplish these changes to the forwarding table at node A for node B/POD B as a destination, POD A controller 150, and POD controllers for other PODs, may report path segment congestion status for each path segment to network controller 130. Network controller 130 may identify one or more second uncongested paths from node A to node B, based on the path segment congestion status for each of these path segments. The network controller 130 may then send to POD A controller 150 one or more path segment update instructions, which may instruct POD A controller 150 to increase or decrease traffic on one or more paths or path segments for traffic directed to node B or POD B. POD A controller 150 may then generate and send forwarding table updates to one or more switches within POD A in order to accomplish the changes to the routing of traffic as instructed by the path segment update instructions received from the network controller 130. For example, node A may receive forwarding table updates from POD A controller 150, e.g., that include adding one or more entries for each of the next lowest-cost paths, A→D→B path, and the A→C>→B path, as both of these paths are 2 hop paths from node A to node B.

Figure 3:
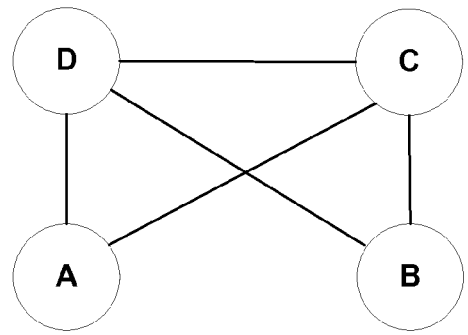
FIG. 3 is a diagram illustrating paths from node A to node B that are not congested according to an example implementation.

FIG. 3 is a diagram illustrating paths from node A to node B that are not congested according to an example implementation. The congested path, directly from node A to node B has been removed, and reflects the remaining uncongested (2-hop and 3-hop) paths from node A to node B. According to one example, the updated forwarding table may look something like the following, based on FIG. 3:

Table 2—Forwarding Table for Node A—Destination of node B:

Entry 1—port 1 (A→B path segment for A→B path)
Entry 2—port 2 (A→C path segment for A→C→B path)
Entry 3—port 3 (A→D path segment for A→D→B path)

In the Table 2, there are now three entries in the forwarding table for routing traffic from A to B. Adding entry 2 and entry 3 tot eh forwarding table for node A may result in at least some of the traffic directed to node B being re-routed over these next higher-cost paths (A→C→B path, and the A→D→B path), while in this example, at least some of the traffic to node B will continue to be routed over the congested shortest path (A→B). By adding an entry in the forwarding table for one or more uncongested next lowest-cost paths, and maintaining at least one entry for the congested lowest-cost paths (according to this example), this may result in a gradual or incremental re-routing of traffic via the new paths, rather than completely moving all traffic from a congested path to the new uncongested path(s).

Figure 4:
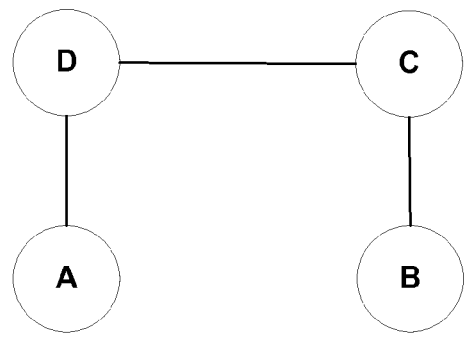
FIG. 4 is a diagram illustrating a 3-hop path from node A to node B that is not congested according to another example implementation.

FIG. 4 is a diagram illustrating a 3-hop path from node A to node B that is not congested according to another example implementation. As shown in FIG. 4, both the 1-hop path (A→B path) and the 2-hop paths (A→C→B path and the A→D→B path) have now become congested, and the next lowest-cost path is a 3-hop path (A→D→C→B). The forwarding table for node A may similarly be updated to add an entry for the 3-hop path via port 3, e.g., to re-route at least some traffic from A that is directed to B via this 3-hop path, based on the congestion of the lower-cost paths. Also, entries may be decreased in the forwarding table for one or more congested paths.

At some point, the lowest-cost path from node A to node B (path A→B) may become uncongested again. This may occur, for example, since this approach has gradually/incrementally been moving or re-routing traffic directed to node B over one or more higher-cost paths, and away from the lowest-cost path. Since the priority is to route traffic on lowest-cost (or lower-cost) paths (e.g., lowest number of hops or path segments) first, the network may begin incrementally or gradually re-routing some traffic back onto the uncongested lowest-cost path(s). According to one illustrative example, a path, after previously being congested, may be determined to be uncongested when path segments for the path each have fewer than a second threshold of congested ports associated with that segment. For example, a second threshold, which may be less than the first threshold to provide hysteresis, may be set to 4 ports. Therefore, if 3 or less ports (e.g., out of a total of 8 ports) associated with the A→B path segment 210 are congested, then the forwarding table at node A for node B as a destination may be updated to increase port weights (e.g., increase a number of table entries) for the now uncongested lowest-cost path, and/or decrease the port weights (e.g., decrease the number of entries in the forwarding table) for one or more higher-cost paths. These changes to the forwarding table may have the effect of re-routing an amount of traffic from the higher-cost paths back to the lowest-cost path.

While forwarding table updates have been described with reference to node A, the forwarding tables for the other nodes B, C and D may similarly be updated first route traffic over lower-cost (or lowest-cost) paths and to respond to congested paths/path segments. For example, for traffic directed from node D to node B, the forwarding table for node D may initially include only one entry for port 2 for the direct 1-hop D→B path. Next, if congestion is detected on that direct (1-hop) D→B path, then one or more entries may be added to the forwarding table for node D for any uncongested 2-hop paths, such as for port 1 (D→A→B path) and/or port 3 (D→C→B path) of node D. However, if, for example, the D→A path segment is also congested (thus indicating that the D→A→B path is congested), then an entry may be added to the forwarding table for node D only for the other 2-hop path D→C→B (via port 3). Later, the POD D controller may determine that the 1-hop D→B path, for traffic directed to node B, has become uncongested. Since the priority is to route traffic on lowest-cost (or lower-cost) paths (e.g., lowest number of hops or path segments) first, the network may begin incrementally or gradually re-routing some traffic back onto the uncongested lowest-cost path(s). Therefore, in response to detecting that the 1-hop (lowest-cost) D→B path is now uncongested, the number of entries in the forwarding table of node D for the 1-hop (lowest-cost) D→B path (via port 2) may be increased, and/or the number of entries in the forwarding table for node D for the 2-hop D→C→B path (via port 3) may be decreased, in order to re-route at least some traffic from the higher-cost path(s) back to the lowest-cost path(s), for example.

Figure 5:
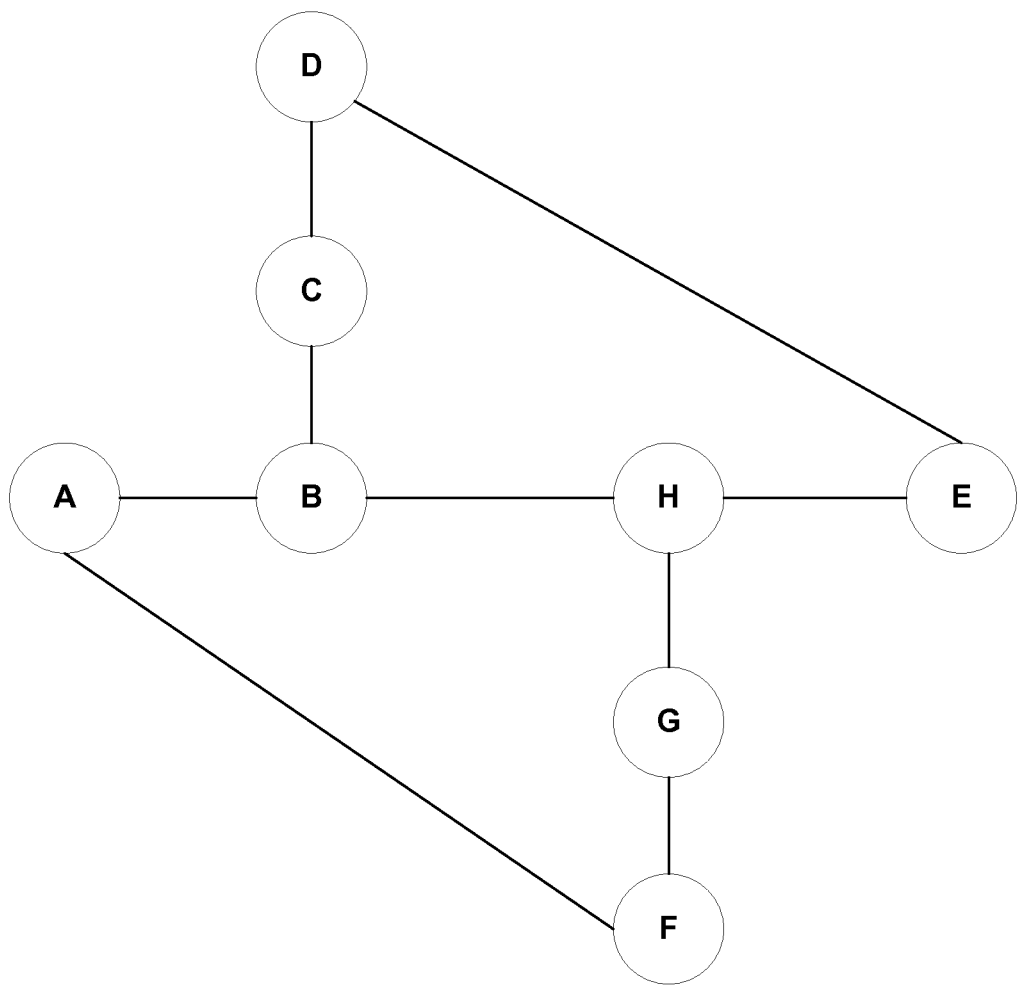
FIG. 5 is a diagram illustrating a network of nodes according to another illustrative example.

FIG. 5 is a diagram illustrating a network of nodes according to another illustrative example. According to an example implementation, the use of a shortest first longer next routing algorithm, for example as described herein, may not always lead to maximizing the achieved throughput and/or minimizing the network latency, especially when the traffic demands are relatively high. For example, as shown in FIG. 5, when routing traffic from node A to node E, and it may be assumed that all links have a 1 unit bandwidth or capacity, according to an example implementation, may send 1 unit of data via the lowest-cost path: the A→B→H→E path. If the traffic demands from node A to node E are greater than unit 1, this might mean that queueing latency may grow or increase to be fairly significant (e.g., queueing delays may be a significant and even the largest delay component in network latency), whereas more demands (e.g., greater than unit 1) may have been accommodated with lower queueing latency by using the two next lowest-cost paths (e.g., A→B→C→D→E and A→F→G→H→E), for example shown in FIG. 5. As noted above, under the various example implementations of a shortest first longer next routing algorithm, if the link between node B and node H has no capacity left in the H→B direction (e.g., becomes congested in the H→B direction), then the shortest path (the A→B→H→E path) may be determined to be congested, and some traffic directed to E may be re-routed to the next lowest-cost paths, for example. Therefore, the shortest first longer next routing algorithm may not necessarily provide a highest throughput or lowest latency at all times, but may typically gradually or incrementally respond to congestion detected on the various paths or path segments.

As described hereinabove, after initially routing traffic over a shortest or lowest-cost path initially, at least some of the traffic may be re-routed over one or more next lowest-cost paths when the lowest-cost path becomes congested. According to an example implementation, traffic may also be shuffled or re-routed among ports associated with a congested path segment, e.g., to re-route or move at least some traffic from one or more congested ports to one or more uncongested ports that are associated with a congested path segment. For example, a hash function may be performed on one or more fields of each packet to identify an entry in a forwarding table, such that packets of a flow may be routed or forwarded via the same output port (e.g., since the hash function of the packet fields of a flow may result in selection of the same forwarding table entry). For example, there may be 5 different ports associated with a path or path segment. Thus, each of these ports may be connected to the adjacent POD via a separate communications link. For 100 different flows that map or lookup to one of the 5 ports of such path segment (e.g., randomly selecting one of those ports based on the hash function), approximately 20 of the flows may be forwarded via each of the different ports, for example. However, some of the flows may be much bigger or may be much more active or generate much more traffic than other flows. Therefore, it is possible that some ports associated with the path segment may quickly become congested while other ports associated with such path segment may not be congested at all. As noted above, if a threshold number of ports associated with the path segment become congested, then the entire path segment may be deemed or determined to be congested, even though several of such associated ports may not be congested.

Therefore, to provide an additional level of congestion response, e.g., based on forwarding table updates received from a POD controller, one or more switches may update its forwarding table in the event that a path segment is determined to be congested to move or re-route traffic/flows from one or more congested ports to one or more uncongested ports. According to an example implementation, port weights (e.g., a number of port entries in the forwarding table) may be increased for such uncongested ports associated with such congested path segment, and port weights may be decreased for congested ports that are associated with such congested path segment. This is merely one example way in which traffic may be re-routed within a group of ports associated with a congested path segment. Other techniques may be used as well.

Below is some pseudocode that describes one example implementation of a shortest first longer next routing technique. This algorithm moves traffic from congested lowest-cost path(s) to uncongested higher-cost path(s).
Input: Network topology and sets of routes between any pair of pods, where routes within the same set have the same length. Sets with shorter paths have smaller indices.
Output: Forwarding weights at the pod level (trivially extendable to per-port forwarding weights).
Define the following variables/functions:
F_congested(i, j): fraction of POD i's congested ports, among those connected to POD J.
F_th: Threshold for F_congested(i, j) above which the overall set of links between the two blocks/PODs to be congested (in the i-to-j direction). Ideally, all forwarding ports interconnecting any pair of blocks/PODs may have the same utilization, and the F_th (or threshold) may be chosen to be 1 if so, but this is unlikely to be the case given that there will be large flows to hash. In practice, there may be two thresholds for F_th in order to avoid flapping back and forth between different routes, one for sensing a set of ports to be congested, and a lower one for sensing that they have become uncongested. The use of these two thresholds may provide a form of hysteresis.
main( ){
Periodically check: //the period would be large enough to avoid overreacting to traffic //bursts and small enough to avoid sluggishness.

```
For all sets i: (for all paths)
    if (is_congested_set(i)==False):
        route_more_on(i);
        break;
}
is_congested_set(i){
    for all flows j in i:
        flow_is_congested = 0;
        for all hops (m, n) in j:
            if is_congested(m, n)
                flow_is_congested = 1;
                break;
        if (!flow_is_congested):
            return false
    return true;
}
is_congested(i, j){
    return F_congested(i, j) >= F_th;
}
route_more_on(i) {
```

//All active sets k<i (i!=1) should have been congested to call this function.
Move to the uncongested paths in i a small fraction or constant c of the traffic currently sent over the highest active set of paths j>i, if any. It might have happened that other sets k<i have gotten even more congested though, so another small fraction or constant c' may be moved from those sets to i.

Figure 6:
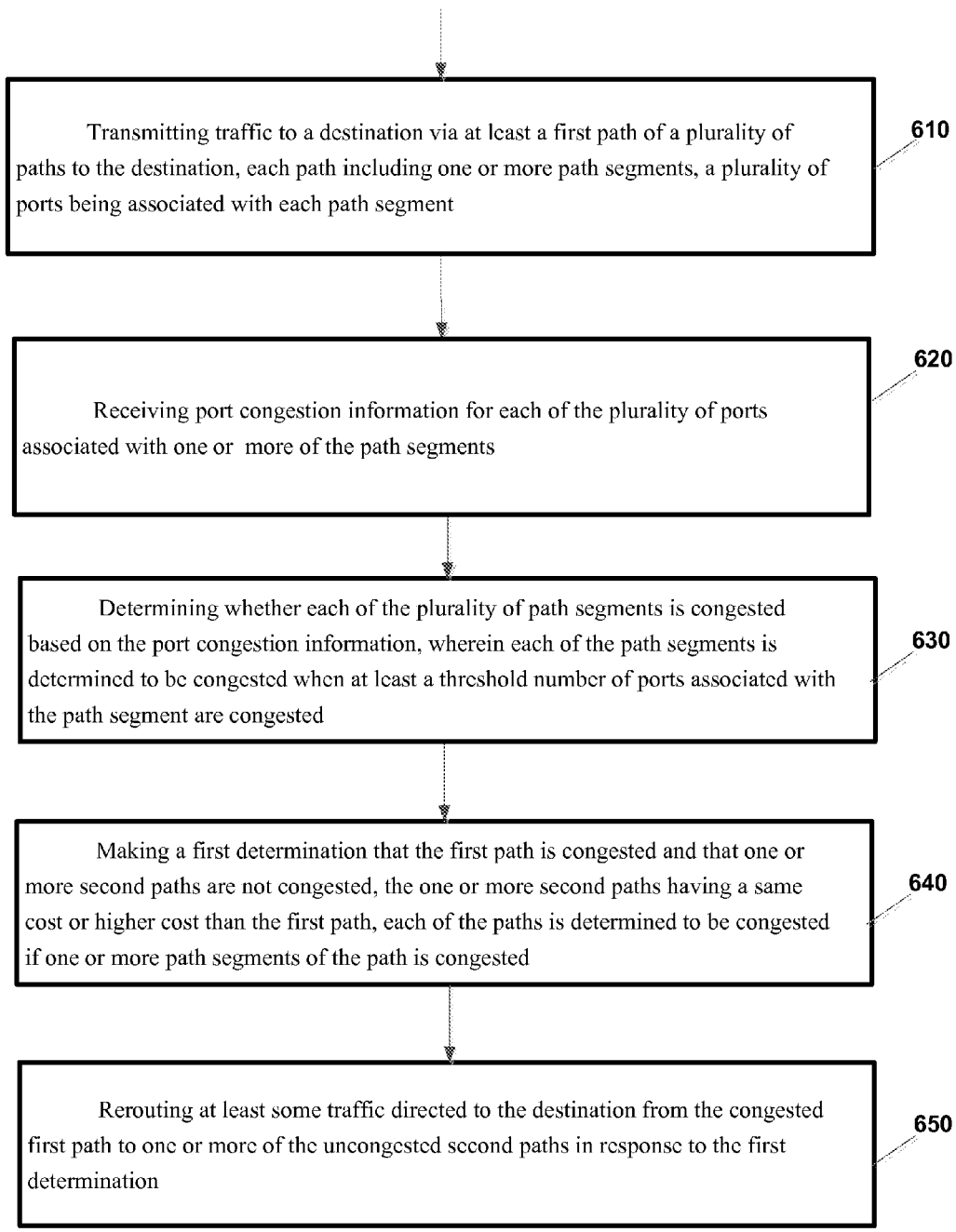
FIG. 6 is a flow chart illustrating operation of a network according to an example implementation.

FIG. 6 is a flow chart illustrating operation of a network according to an example implementation. At 610, traffic is transmitted to a destination via at least a first path of a plurality of paths to the destination, each path including one or more path segments, a plurality of ports being associated with each path segment. At 620, port congestion information is received for each of the plurality of ports associated with one or more of the path segments. At 630, it is determined whether each of the plurality of path segments is congested based on the port congestion information, wherein each of the path segments is determined to be congested when at least a threshold number of ports associated with the path segment are congested. At 640, a first determination is made that the first path is congested and that one or more second paths are not congested, the one or more second paths having a same cost or higher cost than the first path, each of the paths is determined to be congested if one or more path segments of the path is congested. And, at 650, at least some traffic directed to the destination is re-routed from the congested first path to one or more of the uncongested second paths in response to the first determination.

Figure 7:
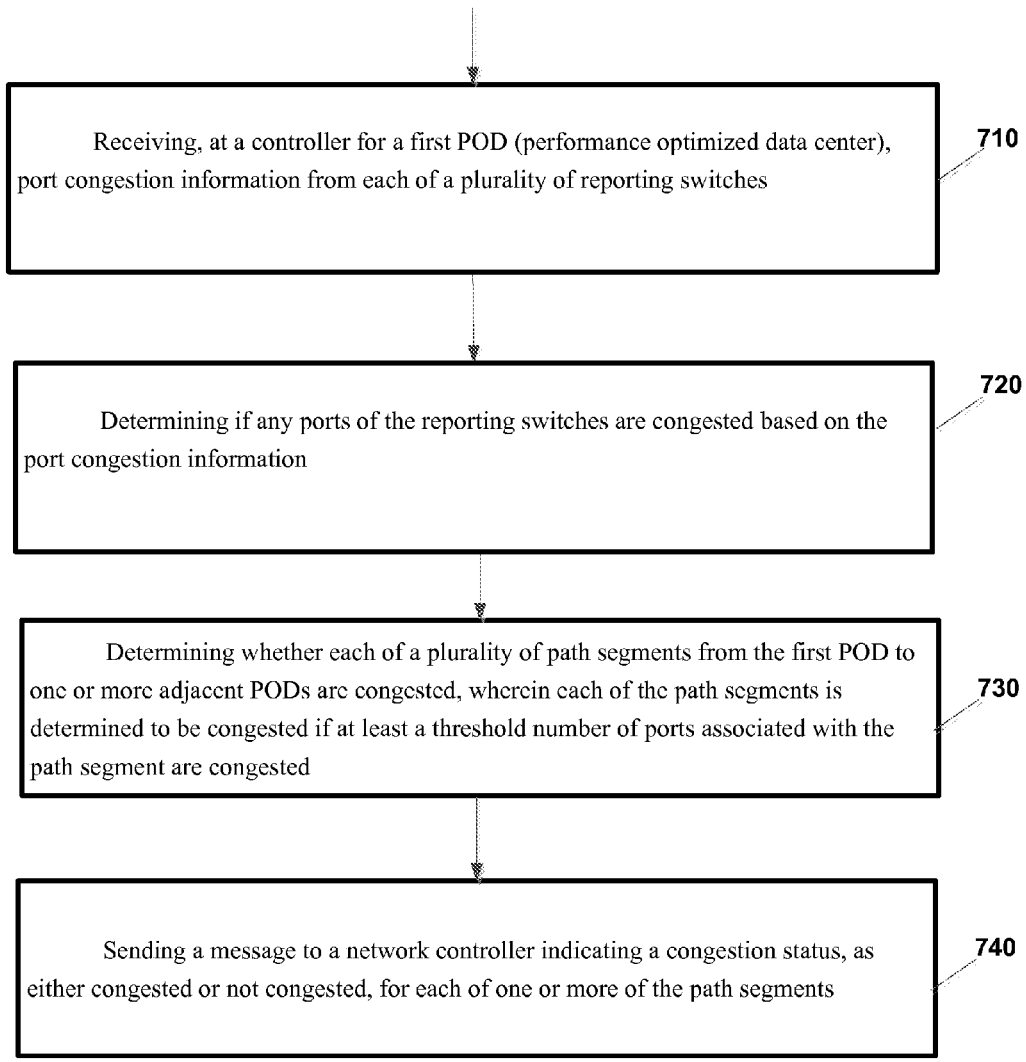
FIG. 7 is a flow chart illustrating operation of a controller in a network according to another example implementation.

FIG. 7 is a flow chart illustrating operation of a controller in a network according to another example implementation. At 710, receiving, at a controller port congestion information is received at a controller for a first POD (performance optimized data center) from each of a plurality of reporting switches. At 720, it is determined if any ports of the reporting switches are congested based on the port congestion information. At 730, it is determined whether each of a plurality of path segments from the first POD to one or more adjacent PODs are congested, wherein each of the path segments is determined to be congested if at least a threshold number of ports associated with the path segment are congested. And, at 740, a message is sent to a network controller indicating a congestion status, as either congested or not congested, for each of one or more of the path segments.

Figure 8:
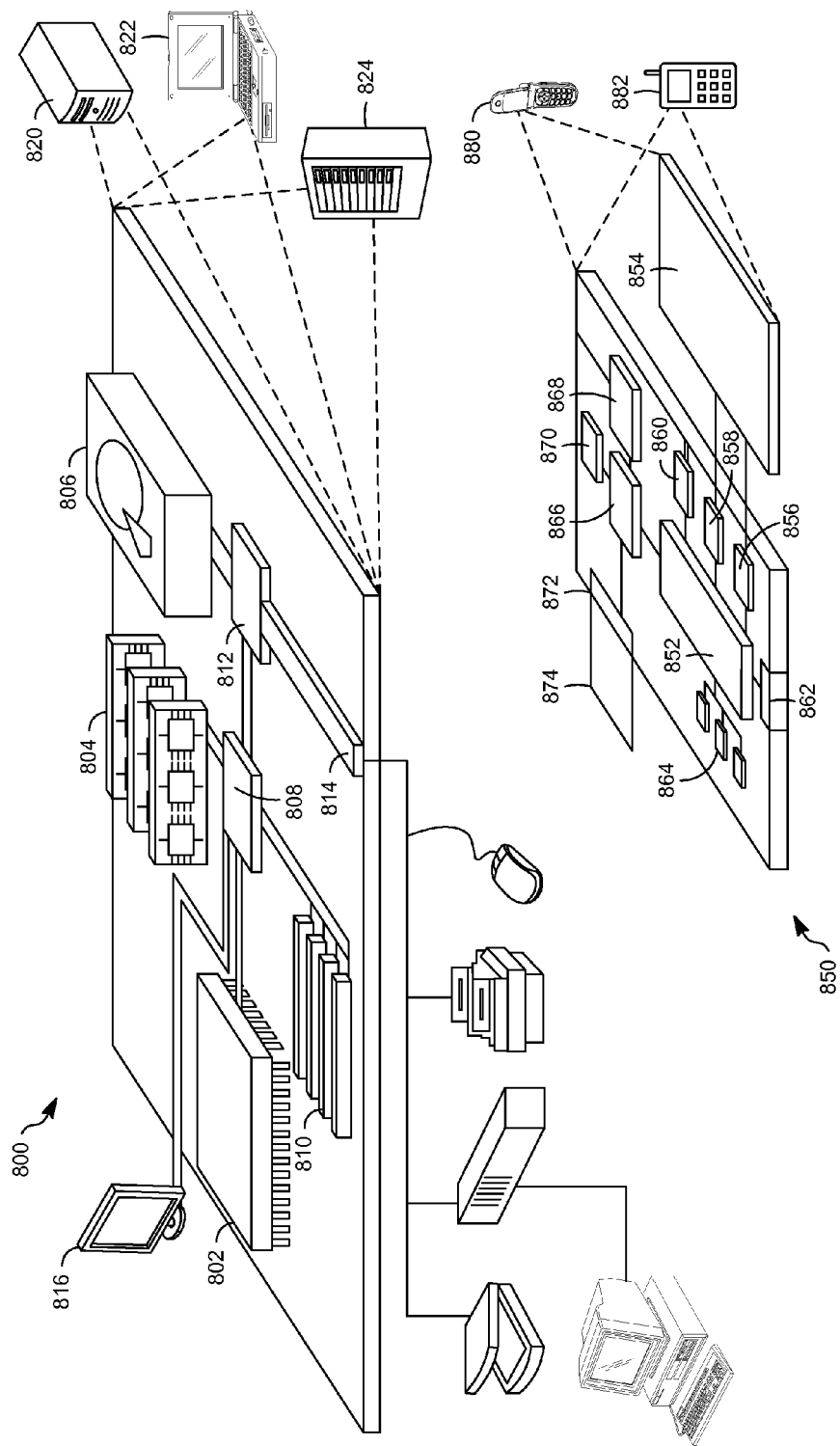
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 504 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880.

It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   transmitting traffic to a destination subnet of a plurality of subnets, each of the plurality of subnets comprising a plurality of interconnected switches via at least a first path of a plurality of paths to the destination subnet, each path including one or more path segments, each path segment including:
      a plurality of links connecting a plurality of corresponding ports in each of two subnets of the plurality of subnets;
   for each of the one or more path segments:
      receiving port congestion information for each of the plurality of ports connected by the plurality of links included in the path segment, and
      determining whether the path segment is congested based on the port congestion information for the ports connected by links included in the path segment, wherein the path segment is determined to be congested when at least a threshold percentage of the plurality of ports within at least one subnet of the two subnets connected by links included in the path segment are congested;
   making a first determination that the first path is congested and that one or more second paths are not congested, the one or more second paths having a same cost or higher cost than the first path, wherein a path is determined to be congested if one or more path segments of the path is congested; and
   re-routing at least some traffic directed to the destination subnet from the congested first path to one or more of the uncongested second paths in response to the first determination.

2. The method of claim 1 wherein making a first determination that the first path is congested and that one or more second paths are not congested, the one or more second paths having a same cost or higher cost than the first path includes determining a path cost based on a number of path segments or hops associated with the path.

3. The method of claim 1 wherein the plurality of links include a plurality of parallel links and wherein the plurality of corresponding ports in each of the two subnets of the plurality of subnets include edge ports.

4. The method of claim 3 wherein path cost is based on a number of segments or hops for the path between a first subnet of the plurality of subnets and the destination subnet.

5. The method of claim 1 wherein the path segment is determined to be congested when at least a threshold number of edge ports associated with the path segment connected to a source subnet are congested, the source subnet belonging to the plurality of subnets.

6. The method of claim 1 wherein re-routing at least some traffic directed to the destination subnet from the congested first path to one or more of the uncongested second paths comprises:
   increasing port weights for the one or more of the uncongested second paths to increase a likelihood that a flow or traffic will be transmitted to the destination subnet via one of the second paths; and decreasing port weights for the congested first path to decrease a likelihood that a flow or traffic will be transmitted to the destination subnet via the congested first path.

7. The method of claim 1 wherein the re-routing at least some traffic directed to the destination subnet from the congested first path to one or more of the uncongested second paths comprises updating a forwarding table for the destination subnet for one or more switches by performing at least one of the following:
    decreasing a number of entries in the forwarding table for ports that are associated with the congested first path; and
    increasing a number of entries in the forwarding table for ports that are associated with the one or more of the uncongested second paths.

8. The method of claim 1 wherein the threshold percentage comprises a first threshold percentage, and wherein one or more of the path segments, after previously being determined to be congested based on the first threshold percentage, is determined to be uncongested if less than a second threshold percentage of the plurality of ports connected by links included in the path segment are congested, wherein the second threshold percentage is less than the first threshold percentage.

9. The method of claim 1 and further comprising:
    for each of the one or more path segments, receiving updated port congestion information for each of the plurality of ports connected by the plurality of links included in the path segment;
    making a second determination, subsequent to the first determination, that the first path is still congested and that the one or more second paths are still not congested;
    re-routing at least some additional traffic directed to the destination subnet from the congested first path to the one or more uncongested second paths.

10. The method of claim 1 and further comprising:
    for each of the one or more path segments, receiving updated port congestion information for each of the plurality of ports connected by the plurality of links included in the path segment;
    making a second determination, subsequent to the first determination, that the first path is not congested;
    re-routing at least some traffic directed to the destination subnet from the one or more second paths to the uncongested first path, the first path having a lower cost than the one or more second paths.

11. The method of claim 10 wherein re-routing at least some traffic directed to the destination subnet from the one or more second paths to the uncongested first path comprises updating a forwarding table for the destination subnet for one or more switches by performing at least one of the following:
    increasing a number of entries in the forwarding table for ports that are associated with the uncongested first path; and
    decreasing a number of entries in the forwarding table for ports that are associated with the one or more second paths.

12. The method of claim 1 and further comprising:
    for each of the one or more path segments, receiving updated port congestion information for each of the plurality of ports connected by the plurality of links included in the path segment;
    making a second determination, subsequent to the first determination, that the first path and the one or more second paths are congested, and that one or more third paths are not congested, wherein the one or more third paths having a higher cost than the first path and the one or more second paths; and
    re-routing at least some traffic directed to the destination subnet from the congested first path and the congested one or more second paths to the uncongested one or more third paths.

13. The method of claim 1 wherein a first group of ports associated with the first path are congested, and a second group of ports associated with the first path are not congested, the method further comprising:
    re-routing at least some of the traffic that is routed to the destination subnet via the first path from using one or more of the congested first group of ports to using one or more of the second group of ports.

14. A computer program product, the computer program product comprising a non-transitory computer-readable storage medium and storing executable code that, when executed by at least one data processing apparatus, is configured to cause the at least one data processing apparatus to perform a method comprising:
    transmitting traffic to a destination subnet of a plurality of subnets, each of the plurality of subnets comprising a plurality of interconnected switches, via at least a first path of a plurality of paths to the destination subnet, each path including one or more path segments, each path segment including:
        a plurality of links connecting a plurality of corresponding ports in each of two subnets of the plurality of subnets;
    for each of the one or more path segments:
        receiving port congestion information for each of the plurality of ports connected by the plurality of links included in the path segment,
        determining whether the path segment is congested based on the port congestion information for the ports connected by links included in the path segment, wherein the path segment is determined to be congested when at least a threshold percentage of the plurality of ports within at least one subnet of the two subnets connected by links included in the path segment are congested;
    making a first determination that the first path is congested and that one or more second paths are not congested, the one or more second paths having a same cost or higher cost than the first path wherein a path is determined to be congested if one or more path segments of the path is congested; and
    re-routing at least some traffic directed to the destination subnet from the congested first path to one or more of the uncongested second paths in response to the first determination.

15. An apparatus comprising at least one processor and at least one memory including computer instructions, when executed by the at least one processor, cause the apparatus to:
    transmit traffic to a destination subnet of a plurality of subnets, each of the plurality of subnets comprising a plurality of interconnected switches, via at least a first path of a plurality of paths to the destination subnet, each path including one or more path segments, each path segment including:

a plurality of links connecting a plurality of corresponding ports in each of two subnets of the plurality of subnets;

for each of the one or more path segments:
  receive port congestion information for each of the plurality of ports connected by the plurality of links included in the path segment,
  determine whether the path segment is congested based on the port congestion information for the ports connected by links included in the path segment, wherein the path segment is determined to be congested when at least a threshold percentage of the plurality of ports within at least one subnet of the two subnets connected by links included in the path segment are congested;

make a first determination that the first path is congested and that one or more second paths are not congested, the one or more second paths having a same cost or higher cost than the first path, wherein a path is determined to be congested if one or more path segments of the path is congested; and re-route at least some traffic directed to the destination subnet from the congested first path to one or more of the uncongested second paths in response to the first determination.

16. A method comprising:

receiving, at a controller associated with a first performance optimized data center (POD) comprising a plurality of interconnected switches, port congestion information from each of a plurality of reporting switches from the plurality of interconnected switches;

determining if any ports of the reporting switches are congested based on the port congestion information;

determining whether each of a plurality of path segments is congested, each path segment including a plurality of links connecting a plurality of ports of the plurality of interconnected switches of the first POD to corresponding ports on an adjacent POD, wherein each of the path segments is determined to be congested if at least a threshold percentage of the plurality of ports of the plurality of interconnected switches of the first POD connected by links included in the path segment are congested; and sending from the controller associated with the first POD to a network controller over a network a message indicating a congestion status, as either congested or not congested, for each of the plurality of path segments.

17. The method of claim 16 and further comprising:

receiving, at the controller associated with the first POD from the network controller, one or more path segment update instructions that instruct the controller associated with the first POD to adjust an amount of traffic transmitted via one or more of the path segments;

determining forwarding table updates for one or more switches of the first POD to adjust an amount of traffic transmitted via one or more of the path segments in accordance with the one or more path segment update instructions; and sending the determined forwarding table updates to one or more switches within the POD.

18. The method of claim 16, wherein the plurality of reporting switches is a subset of the plurality of interconnected switches of the first POD.

19. A computer program product, the computer program product comprising a non-transitory computer-readable storage medium and storing executable code that, when executed by at least one data processing apparatus, is configured to cause the at least one data processing apparatus to perform a method comprising:

receiving, at a controller associated with a first performance optimized data center (POD) comprising a plurality of interconnected switches, port congestion information from each of a plurality of reporting switches from the plurality of interconnected switches;

determining if any ports of the reporting switches are congested based on the port congestion information;

determining whether each of a plurality of path segments is congested, each path segment including a plurality of links connecting a plurality of ports of the plurality of interconnected switches of the first POD to corresponding ports on an adjacent POD, wherein each of the path segments is determined to be congested if at least a threshold percentage of the plurality of ports of the plurality of interconnected switches of the first POD connected by links included in the path segment are congested; and sending from the controller associated with the first POD to a network controller over a network a message indicating a congestion status, as either congested or not congested, for each of the plurality of path segments.

20. An apparatus comprising at least one processor and at least one memory including computer instructions, when executed by the at least one processor, cause the apparatus to:

receive, at a controller associated with a first performance optimized data center (POD) comprising a plurality of interconnected switches, port congestion information from each of a plurality of reporting switches from the plurality of interconnected switches;

determine if any ports of the reporting switches are congested based on the port congestion information;

determine whether each of a plurality of path segments is congested, each path segment including a plurality of links connecting a plurality of ports of the plurality of interconnected switches of the first POD to corresponding ports on an adjacent POD, wherein each of the path segments is determined to be congested if at least a threshold percentage of the plurality of ports of the plurality of interconnected switches of the first POD connected by links included in the path segment are congested; and send from the controller associated with the first POD to a network controller over a network a message indicating a congestion status, as either congested or not congested, for each of the plurality of path segments.

* * * * *